United States Patent
Lamour et al.

(10) Patent No.: US 11,900,461 B2
(45) Date of Patent: *Feb. 13, 2024

(54) EXCHANGE FOR PHYSICALS

(71) Applicant: LIFFE Administration and Management, London (GB)

(72) Inventors: Benoit Andre Lamour, London (GB); Anais Fabienne Christiane Dony, Vincennes (FR)

(73) Assignee: LIFFE Administration and Management, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,055

(22) Filed: Aug. 24, 2023

(65) Prior Publication Data

US 2023/0394579 A1    Dec. 7, 2023

Related U.S. Application Data

(63) Continuation of application No. 18/118,489, filed on Mar. 7, 2023, now Pat. No. 11,783,419, which is a continuation of application No. 17/684,741, filed on Mar. 2, 2022, now Pat. No. 11,636,545, which is a continuation of application No. 17/234,909, filed on Apr. 20, 2021, now Pat. No. 11,308,558, which is a continuation of application No. 17/064,839, filed on Oct. 7, 2020, now Pat. No. 11,017,473, which is a continuation of application No. 14/341,078, filed on Jul. 25, 2014, now Pat. No. 10,832,323.

(60) Provisional application No. 61/861,297, filed on Aug. 1, 2013.

(51) Int. Cl.
G06Q 40/04    (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS

| 9,501,795 | B1 | 11/2016 | Friedman | |
|---|---|---|---|---|
| 2003/0046218 | A1 | 3/2003 | Albanese et al. | |
| 2009/0125434 | A1* | 5/2009 | Mikulecz | G06Q 40/04 705/37 |
| 2011/0055112 | A1* | 3/2011 | Haines | G06Q 40/06 705/36 R |

(Continued)

OTHER PUBLICATIONS

Singapore Search and Examination Report dated Aug. 1, 2017, of corresponding Singapore Application No. 10201404490U.

(Continued)

*Primary Examiner* — Edward Chang
(74) *Attorney, Agent, or Firm* — DLA Piper LLP (US)

(57) ABSTRACT

Systems and methods for performing an exchange for physicals (EFP) may comprise receiving, with a matching engine module in communication with a processor, EFP data comprising an amount of securities to be traded and a price. The matching engine module may calculate a first delta percentage between the EFP data and an index based on the amount, the price, and an index value. The matching engine module may calculate a residual delta based on the first delta percentage and an index notional value. The matching engine module may attribute the residual delta to the securities.

14 Claims, 4 Drawing Sheets

(56) References Cited

U.S. PATENT DOCUMENTS

2011/0078090 A1* 3/2011 Peterffy ............... G06Q 40/04
　　　　　　　　　　　　　　　　　　　　705/37
2012/0185372 A1　　7/2012 McIntosh
2012/0254009 A1　10/2012 Thorp

OTHER PUBLICATIONS

Business Line, "*BSE Set to Launch New Derivative Product to De-risk Arbitrage*," Chennai, India, 2012.

* cited by examiner

EXCHANGE FOR PHYSICALS

TECHNICAL FIELD

The present disclosure relates generally exchange for physicals (EFP) transactions, and more particularly, to systems and methods for providing new products and trading strategies for expanding EFP transactions into new markets.

BACKGROUND

In the exchange of futures for physicals (EFP) transactions, a futures contract on a commodity is generally exchanged for the actual commodity. An EFP may be a trade on a basis corresponding to the difference between a futures price and a spot price on which the futures price is based. EFPs may be traded over the counter (OTC), and the futures leg of the transaction may be reported with reference to a cash leg. There is, however, a need for new products and strategies that provide a more comprehensive EFP solution, and that expand EFP transactions into new markets.

SUMMARY

Systems and methods described herein may provide a central order book for EFPs. Simultaneous trades in index futures contracts and the corresponding basket of shares on regulated markets may be affected. An EFP may be based on an index, and its value expressed in terms of index points. An EFP based on an index may comprise a trade on the basis corresponding to the difference between an index futures price and an index spot price. For example, one EFP index may have a value of 3495 index points and a particular futures may be priced at 3486 index points, then the EFP price for a trade may be 3486−3495=−9 index points. This may allow allocation of EFP residuals in a way that closely matches the market. The EFP may be traded continuously and anonymously. Multiple EFP expiry months may be made available for trading. Market makers may provide price support and ensure liquidity of the EFP order book. Both the futures leg and the cash leg derived from the EFP transaction may be cleared by a suitable clearing facility.

BRIEF DESCRIPTIONS OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Systems and methods described herein may provide new, index-based EFP transactions. An on-exchange EFP cleared market may include detailed and specific mechanisms such as a pre-negotiated trade facility, price limits, market surveillance, and/or an automated price allocation mechanism.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically (e.g., via a wired network), through wireless links (e.g., via a wireless network), or via a combination thereof. Computers may also comprise software which may direct the operations of the aforementioned components. Computers may be referred to with terms that are commonly used by those of ordinary skill in the relevant arts, such as servers, PCs, mobile devices, routers, switches, data centers, tablets, mobile communication devices, smartphones, distributed computers, and other terms. Computers may facilitate communications between users and/or other computers, may provide databases, may perform analysis and/or transformation of data, and/or perform other functions. It will be understood that those terms, as used herein, are interchangeable, and any computer capable of performing the described functions may be used.

Computers may be linked to one another via a network or networks, whether wired and/or wireless. A network may be any plurality of completely or partially interconnected computers wherein some or all of the computers are able to communicate with one another. Connections between computers may be wired (e.g., via Ethernet, coaxial, optical, or other wired connection), wireless (e.g., via Wi-Fi, WiMax, or other wireless connection), or a combination thereof. Connections between computers may use any protocols, including connection oriented protocols such as TCP or connectionless protocols such as UDP. Any connection through which at least two computers may exchange data can be the basis of a network.

Figure 1:
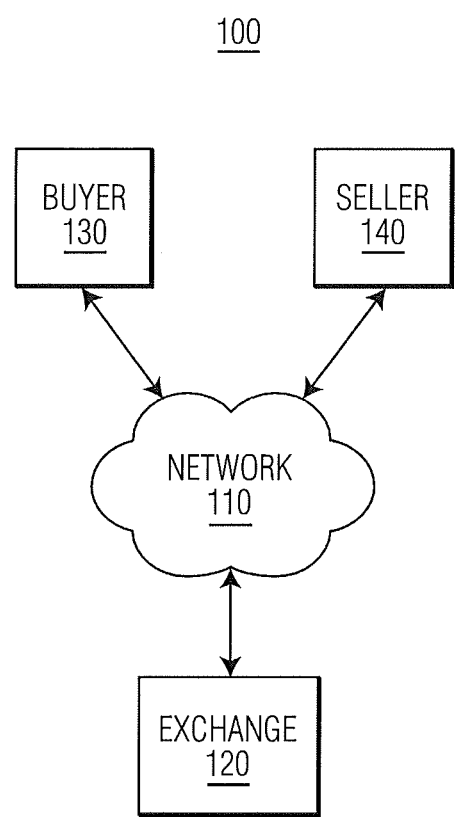
FIG. 1 shows an exemplary network according to an embodiment of the present disclosure.

Turning now to FIG. 1, a network 100 according to an exemplary embodiment of the present disclosure is shown. The network 100 may include an exchange network 110, for example the Internet or a dedicated market network, connecting one or more computers 120, 130, 140. For example, an exchange 120 may include one or more computers in communication with the network 110; and one or more buyer 130 computers and one or more seller 140 computers may communicate with the exchange 120 and/or each other via the network 110. The exchange 120 computer may include a matching engine module (not shown) comprising computer-readable instructions that, when executed by a processor, cause the exchange computer to perform various functions described herein. The network 100 of FIG. 1 is one possible example network, and the exchange 120 computers, buyer 130 computers, and seller 140 computers may be interconnected in any way.

Figure 2:
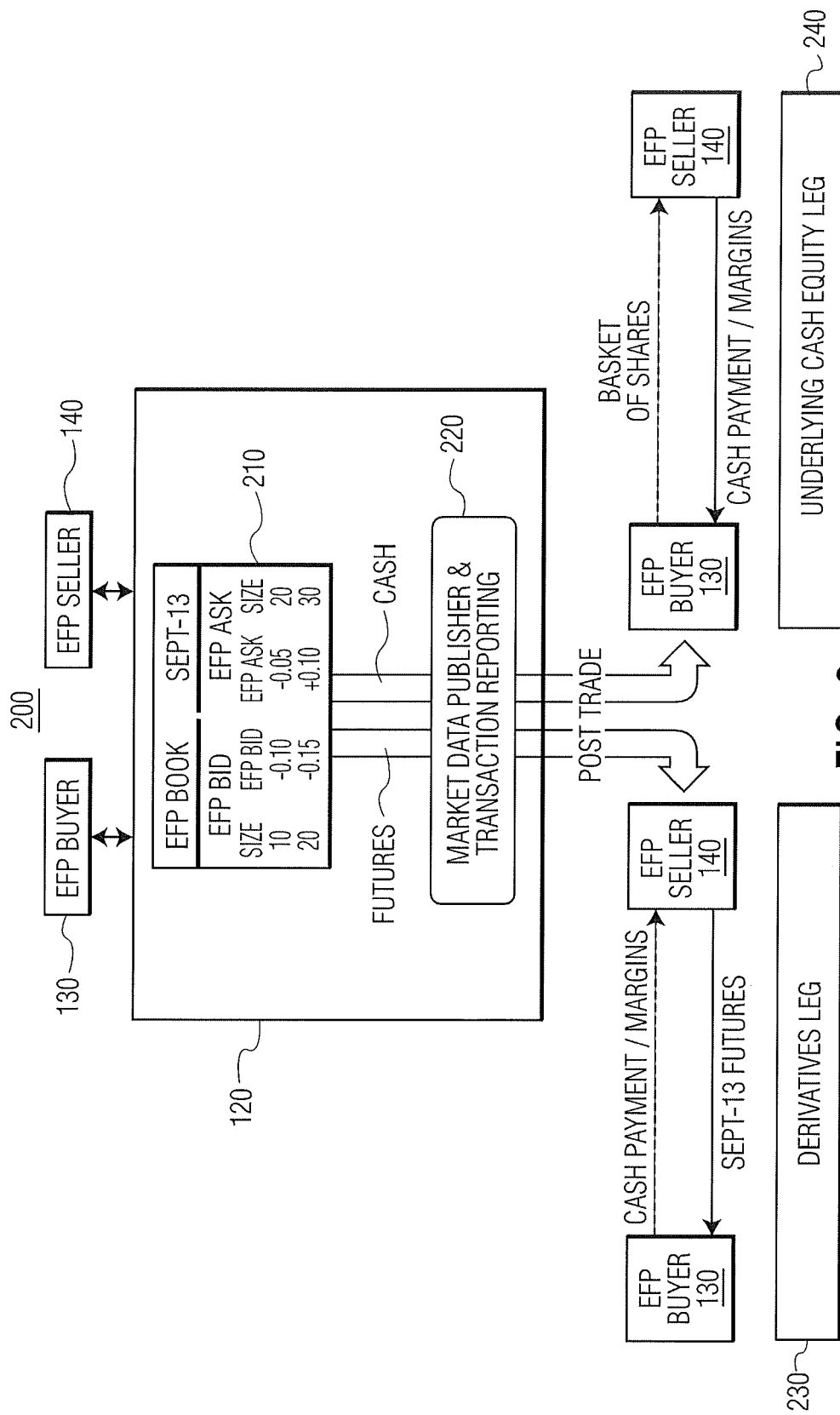
FIG. 2 shows an exemplary EFP transaction flow diagram according to an embodiment of the present disclosure.

FIG. 2 shows an exemplary EFP transaction flow diagram 200 according to an embodiment of the present disclosure. In this example, EFP transactions (or "EFPs") may be based on an index. As shown in the flow diagram 200, an order book 210 embodied on one or more computers 120 may be accessible to a buyer computer 130 and/or a seller computer 140 via, for example, at least one of a wired and/or wireless network connection. The one or more computers 120 embodying the order book 210 may be a part of a computerized exchange platform 120 or other similar facility or system.

In operation, the EFP buyer computer 130 and EFP seller computer 140 may submit EFP orders (e.g., EFP Buy and EFP Sell orders) to the exchange platform 120. In this embodiment, the EFP is a "Sept-13" EFP. Once the price of the order(s) submitted by the EFP buyer computer 130 and EFP seller computer 140 reach an equilibrium point, orders are matched, and, an EFP trade with two legs may be created. The EFP Buy and EFP Sell orders have become an EFP trade with an agreed EFP price. The execution of the EFP trade implies the execution of two legs per EFP trade: a derivatives leg 230 of the EFP and the underlying cash equity leg 240 of the EFP. To reach an equilibrium in the EFP order book 210, the price of an incoming order may be compared to the price of orders already in the order book 210 on the opposite side (e.g., counter orders). If the price is acceptable, orders in the EFP order book 210 may be selected and matched with the incoming order. The selection of orders in the EFP order book 210 may follow a pre-specified priority rule (for example "price/time priority", whereby orders with the best price (i.e. highest prices on the buy side and lowest prices on the sell side) are matched first, and within the same price, best priority orders (i.e., orders arriving first or orders having the oldest timestamp) are matched first). However, it should be understood that other priority and/or matching rules, or no priority and/or matching rules, may be utilized in accordance with the present disclosure.

Once orders are matched (e.g., an EFP Buy order and an EFP Sell order), the exchange platform 120 may automatically (1) calculate both a price and a quantity to a futures leg and a cash leg for each of the underlying index securities components; and (2) generate an EFP transaction comprising one futures leg transaction and a cash leg transaction for each of the underlying index securities components. On the derivatives leg 230, a cash payment (or any other type of payment) and/or a margin change (e.g., reduced margin call) may be made from a buyer (via the buyer computer 130) to a seller (via the seller computer 140) through the exchange platform 120 acting as a central counterparty, in exchange for the Sept-13 futures from the seller (via seller computer 140) to the buyer (via buyer computer 130).

On the underlying cash equity leg 240 of the EFP, cash payment (or any other type of payment) and/or a margin change (e.g., reduced margin call) may be made from the seller (via seller computer 140) to the buyer (via buyer computer 130) through the central exchange platform 120 operating as the central counterparty, in exchange for a basket of shares from buyer (via the buyer computer) 130) to the seller (via the seller computer 140). Additionally, an acknowledgment with EFP trade attributes may be sent (by the exchange platform 120) to the buyer and seller via their respective computers (130, 140), for example, via a wired and/or wireless network by a market data publisher and transaction reporting module 220 of the exchange platform 120. Prices of the individual cash securities may be automatically allocated, for example, by the exchange platform 120, as further discussed below. This automatic allocation may be based on, for example, an agreed EFP price and a last traded price of each underlying index security component, which may then be adjusted by applying an equivalent percentage deviation to each index security component while at the same time minimizing any residual price deviation resulting from a price rounding. In one embodiment, the generation of the prices of all the cash and futures legs may be determined such that a difference between the value of the index futures leg and the basket of shares is equal to the EFP price multiplied by the volume traded. Once the prices are allocated, trades may be published and reported to regulators and clearing house.

In some embodiments, a minimum trade size (e.g., in terms of lots) may apply, as well as a minimum incremental trade size. For example, for a minimum trade size of 250 lots and incremental size of 50 lots, orders which may be executed may be orders for 250 lots, 300 lots, 350 lots, and so on. New orders below 250 lots or for lots that are not in increments of may be rejected by the exchange platform 120.

Some embodiments may also include a price limit mechanism. Price limits may be set above and/or below a theoretically calculated EFP price in between which the EFP can be traded. For instance, for a price limit of three (3) index points and a theoretical EFP price (e.g., the "price limit reference price") is calculated to be negative five (−5), the EFP may trade anywhere from between negative eight (−8) and negative two (−2) index points. Thus, an order at negative nine (−9) index points may be rejected. Price limits may be adjusted periodically (e.g., daily) and may be monitored by a market services analyst system.

In some embodiments, the exchange platform 120 may have specified contract trading hours for EFPs. For example, contract trading hours for one market may be between 9.00 to 18.30, opening in line with the cash markets, and closing at the end of the index futures' day session, one hour after the close of the cash markets. Notably, however, other trading hours (or no specified trading hours) may be implemented in accordance with this disclosure. In addition, certain EFPs may continue to be available even in the case where one or more securities in the index are no longer available for any reason (e.g., one or more securities are suspended).

Figure 3:
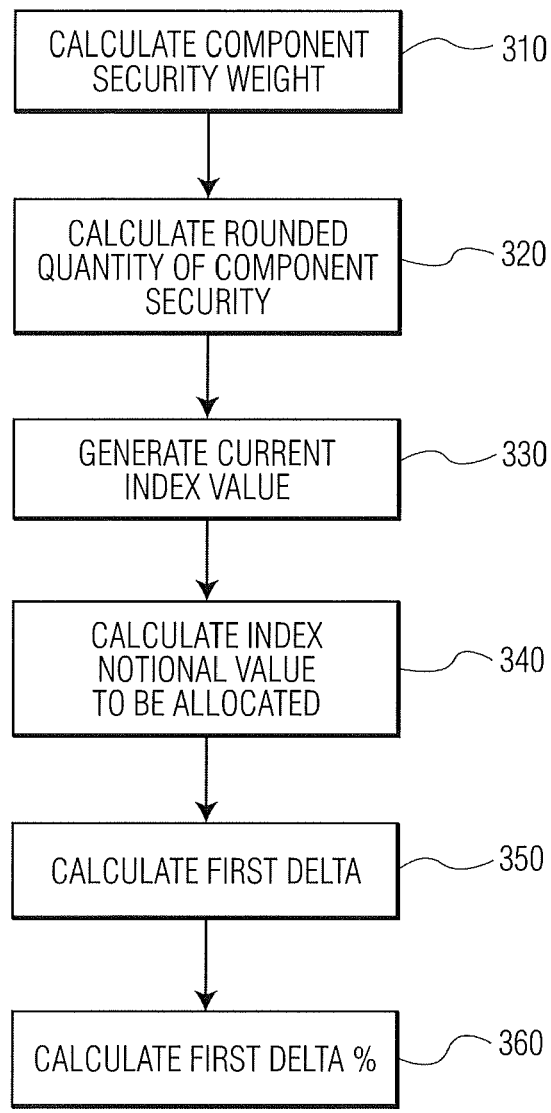
FIG. 3 shows an exemplary quantity calculation process according to an embodiment of the present disclosure.
Figure 4:
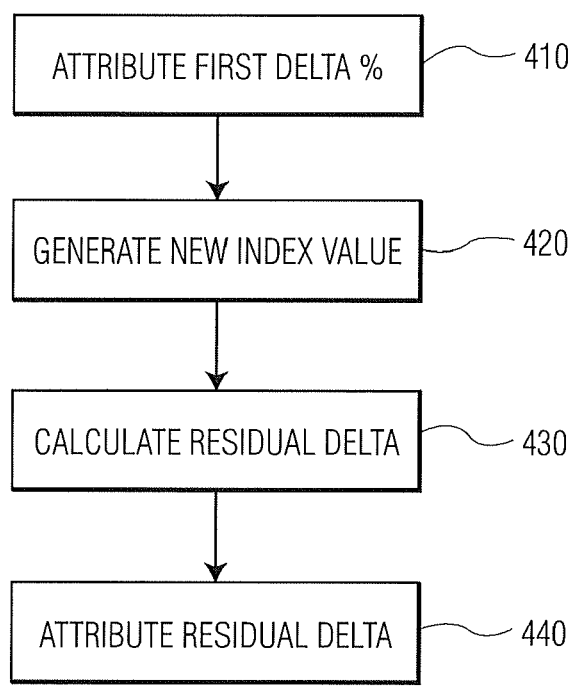
FIG. 4 shows an exemplary price calculation process according to an embodiment of the present disclosure.

Prices of the cash individual securities may be allocated automatically using a price allocation module. The price allocation module may comprise computer-readable instructions that when executed (by one or more processors) determines and calculates automatically the cash prices and quantities to be affected to each constituent stock security such that it reflects the value of the cash leg traded embedded in the EFP price, such that a combined EFP cash basket constituent prices may closely match an agreed basis/EFP price. The allocation module may allocate residuals to a constituent of an index to closely mirror the index itself. This price allocation module (and other modules described herein) may be a part of (and/or performed by) a matching engine module of a computer system, such as (for example) an exchange platform similar to the one discussed above with respect to FIG. 2. FIGS. 3-4 illustrate example computer-implemented processes for automatically calculating and allocating EFP prices in accordance with this disclosure.

Turning now to FIG. 3, an exemplary quantity calculation process 300 according to an embodiment of the present disclosure is shown. This process 300 may be performed automatically by an exchange platform computer/computer system (e.g., such as exchange platform 120 of FIG. 2) when an EFP is agreed upon between a buyer and seller. Thus, for purposes of this exemplary embodiment, it is assumed that data representing a notational amount to be traded and a corresponding price has been received/entered into the computer (e.g., exchange platform) performing this quantity calculation process 300. Upon receiving this data, the computer, in step 310, may calculate a component security weight from a free float, as defined by the number of shares that are readily available to the public and taking into account the specificities of the index methodology to define the restricted shares that are not taken into account and excluded from the free float, and a number of shares for each component security using, for example, the Equation 1, below.

$$\text{component security weight} = \text{free float} * \text{number of shares} \quad (1)$$

In Table 1, for instance, company share "A" only has free floating shares, therefore the "component security weight" is the same as the total number of shares in that company. In the case of company "B", for example, 60% of the total number of shares are free float, therefore, the component security weight is 60% of 125,971,058.

Next, in step 320, for each component security, the computer may calculate a rounded quantity of component security from the component security weight, an EFP quantity, an index future lot size, and an index divisor. The rounded quantity of component security ("RQCS") may have all decimals removed, and may be calculated according to Equation 2, below.

$$RQCS = \frac{(EFP \text{ quantity} * \text{index component security weight} * \text{future lot size})}{(\text{index divisor})} \quad (2)$$

As shown in Table 1, for instance, the "RQCS" of the first security "A" may be rounded to zero decimals of the first security as a result of Equation (2):

$$RQCS = \frac{1000 * 91,961,373 * 10}{189,994,497.400937} = 4840$$

The EFP quantity is the quantity traded: 1000 in the example outlined in Table 1. The index divisor may be available to the market, and in this example, it is 189,994,497.40). The component security weight may then be calculated for each constituent security, as discussed above. For company A of Table 1, for example, it is 91,961,373. The futures lot size may be fixed by an exchange platform in the relevant contract specifications (in this example, for a particular index futures, it is fixed at 10 lots by an exchange platform).

In step 330, the computer may sum all the rounded quantities of component securities multiplied by their Last Traded Price ("LTP") to generate the current index value, as shown in Equation 3.

$$\text{current index value} = \sum_{i=1}^{40} (RQCS_i * LTP \text{ component security}) \quad (3)$$

In Table 1, for instance, the Current index value corresponds to 34,953,786=(4,840*169.25)+(3,978*137.95)+

Then, at step 340, the computer may calculate an index notional value to be allocated from the index future LTP, EFP price, EFP quantity, and index future lot size according to Equation 4, below.

index notional to be allocated=[LTP of index future−EFP price]*EFP quantity*future lot size (4)

In the example illustrated by Table 1 below, for instance, the Index Notional to be Allocated is 34,950,000=[3486.00−(−9)] *1000*10. The Last Traded Price of the relevant index futures is available market information. The EFP quantity is the quantity traded: 1000 in the example outlined in Table 1. The futures lot size may be fixed by an exchange platform in the relevant contract specifications (in this example, for a particular index futures, it is fixed at 10 lots by an exchange platform).

The allocation algorithm may also include a "first delta" calculation to limit rounding errors and match as close as possible the notional value of the index. In step 350, the computer may calculate a first delta as the difference between the index notional value to be allocated and the current index value, as shown in Equation 5.

first delta=index notional value to be allocated−current index value (5)

In Table 1, for instance, the first delta would be 34,950,000−34,953,786=−3,786.

Next, in step 360, the computer may calculate a first delta percentage from the first delta and the current index value, as shown in Equation 6 below.

$$\text{first delta \%} = \frac{\text{first delta}}{\text{current index value}} \quad (6)$$

As shown in Table 1, for instance, the first delta would be −3,786/34,953,786=−0.0108%. The illustrative results of the exemplary quantity calculation process 300 shown in FIG. 3 and discussed above are displayed in Table 1 below.

TABLE 1

| | | | | | | | |
|---|---|---|---|---|---|---|---|
| LTP of the Index Future | | | | | | 3486.00 | |
| Future Lot Size | | | | | | 10 | |
| Index Divisor | | | | | | 189,994,497.400937 | |
| EFP Price | | | | | | −9 | |
| EFP Quantity | | | | | | 1000 | |

| | ISIN Code Index Component Security | Name | Last Traded Price | Free Float | Number of Shares | Component Security Weight (absolute) Step 310: Free float × Number of Shares | Rounded Quantity of Component Security to Zero Decimals Step 320 |
|---|---|---|---|---|---|---|---|
| 1 | FR0000000001 | "A" | 169.25 | 1 | 91,961,373 | 91,961,373 | 4,840 |
| 2 | FR0000000005 | "B" | 137.95 | 0.6 | 125,971,058 | 75,582,635 | 3,978 |
| 3 | FR0000000009 | "C" | 129.05 | 0.5 | 507,919,825 | 253,959,913 | 13,367 |
| 4 | FR0000000013 | "D" | 103.1 | 0.4 | 602,984,082 | 241,193,633 | 12,695 |
| 5 | FR0000000017 | "E" | 97.73 | 0.7 | 84,701,133 | 59,290,793 | 3,121 |
| 6 | FR0000000021 | "F" | 93.86 | 1 | 312,070,021 | 312,070,021 | 16,425 |
| 7 | FR0000000025 | "G" | 87.32 | 0.9 | 112,933,663 | 101,640,297 | 5,350 |
| 8 | FR0000000029 | "H" | 86.45 | 0.75 | 265,310,605 | 198,982,954 | 10,473 |
| 9 | FR0000000033 | "I" | 73.81 | 0.9 | 213,071,956 | 191,764,760 | 10,093 |

TABLE 1-continued

| 10 | FR0000000037 | "J"  | 68.89  | 1    | 181,999,897   | 181,999,897   | 9,579   |
|----|--------------|------|--------|------|---------------|---------------|---------|
| 11 | FR0000000011 | "K"  | 68.23  | 0.9  | 1,326,829,007 | 1,194,146,106 | 62,852  |
| 12 | FR0000000012 | "L"  | 51.99  | 0.95 | 553,218,921   | 525,557,975   | 27,662  |
| 13 | FR0000000014 | "M"  | 48.86  | 0.9  | 643,162,000   | 578,845,800   | 30,466  |
| 14 | FR0000000014 | "N"  | 43.69  | 0.65 | 287,247,518   | 186,710,887   | 9,827   |
| 15 | NL0000000001 | "O"  | 43.225 | 0.85 | 210,008,734   | 178,507,424   | 9,395   |
| 16 | NL0000000002 | "P"  | 41.865 | 0.8  | 1,253,727,565 | 1,002,982,052 | 52,790  |
| 17 | NL0000000025 | "Q"  | 38.255 | 0.9  | 2,365,134,263 | 2,128,620,837 | 112,036 |
| 18 | NL0000000004 | "R"  | 37.975 | 0.85 | 121,626,521   | 103,382,543   | 5,441   |
| 19 | NL0000000005 | "S"  | 37.895 | 0.65 | 295,722,284   | 192,219,485   | 10,117  |
| 20 | NL0000000006 | "T"  | 33.445 | 0.8  | 575,410,549   | 460,328,439   | 24,229  |
| 21 | NL0000000007 | "U"  | 31.4   | 0.9  | 155,770,362   | 140,193,326   | 7,379   |
| 22 | NL0000000008 | "V"  | 30.835 | 0.55 | 417,029,585   | 229,366,272   | 12,072  |
| 23 | NL0000000009 | "W"  | 29.94  | 0.75 | 531,064,935   | 398,298,701   | 20,964  |
| 24 | NL0000000010 | "AM" | 29.795 | 0.95 | 263,388,995   | 250,219,545   | 13,170  |
| 25 | NL0000000011 | "AN" | 27.28  | 0.7  | 294,808,487   | 206,365,941   | 10,862  |
| 26 | NL0000000012 | "Z"  | 26.845 | 0.85 | 780,271,348   | 663,230,646   | 34,908  |
| 27 | NL0000000013 | "AA" | 25.35  | 0.5  | 827,060,325   | 413,530,163   | 21,765  |
| 28 | NL0000000014 | "AB" | 25.2   | 0.75 | 227,251,446   | 170,438,585   | 8,971   |
| 29 | NL0000000015 | "AC" | 18.885 | 0.8  | 709,214,653   | 567,371,722   | 29,863  |
| 30 | NL0000000016 | "AD" | 17.98  | 0.6  | 314,869,079   | 188,921,447   | 9,944   |
| 31 | NL0000000017 | "AE" | 17.05  | 0.55 | 2,323,080,932 | 1,277,694,513 | 67,249  |
| 32 | NL0000000018 | "AF" | 16.465 | 0.9  | 1,301,127,185 | 1,171,014,467 | 61,634  |
| 33 | NL0000000019 | "AG" | 14.1   | 0.15 | 1,848,866,662 | 277,329,999   | 14,597  |
| 34 | NL0000000020 | "AH" | 12.365 | 0.75 | 2,357,335,873 | 1,768,001,905 | 93,055  |
| 35 | NL0000000021 | "AI" | 11.62  | 0.6  | 1,560,914,610 | 936,548,766   | 49,293  |
| 36 | NL0000000022 | "AJ" | 8.202  | 0.7  | 2,648,885,383 | 1,854,219,768 | 97,593  |
| 37 | NL0000000023 | "AK" | 8.176  | 0.7  | 522,086,849   | 365,460,794   | 19,235  |
| 38 | NL0000000024 | "AL" | 5.78   | 0.4  | 2,498,020,537 | 999,208,215   | 52,591  |
| 39 | NL0000000003 | "X"  | 4.633  | 0.7  | 910,559,805   | 637,391,864   | 33,548  |
| 40 | FR0000000007 | "Y"  | 0.819  | 0.95 | 2,326,563,826 | 2,210,235,635 | 116,332 |

Current Index Value (Step 330): 34,953,786
Index Notional to be Allocated (Step 340): 34,950,000
First Delta: −3,786
First Delta % (Step 360): −0.0108%

After a first delta percentage calculated (e.g., according to the process 300 of FIG. 3), a price may be calculated. FIG. 4 illustrates an exemplary price calculation process 400 according to an embodiment of the present disclosure. This process 400 may be performed automatically by a computer or computer system, such as, for example, an exchange platform computer.

At step 410, the computer may attribute the first delta percentage equally to each component security according to Equation 7 below, so that the percent price change is the same for each component security. This may produce a new component security price for each component security. As shown in Table 2 below, the new component security price of share "A" is the LTP (169.25) multiplied by 1+ the delta calculated above, or 1+(−0.0108%)=The result: 169.25*0.9892=169.2317 is rounded to 4 decimal places.

$$\text{new component security price} = LTP \text{ component security} * (1 + \text{delta \%}) \text{ rounded to one or more decimal places} \quad (7)$$

In one embodiment, the new component security price may be rounded to four or more decimal places.

Then, at step 420, the computer may sum the rounded quantities of component securities (which may be calculated from the quantity calculation of Equation 2 above) multiplied by their new component security price (which may be calculated from the quantity calculation of Equation 7 above) to generate the new index value, as shown in Equation 8. In the exemplary results shown in Table 2, for instance, the new index value is $$34{,}950{,}013 = (4{,}840 * 169.2317) + (3{,}978 * 137.9351) + \ldots \text{new index value} = \sum_{i=1}^{40} \text{rounded quantity of component security}_i * \text{new component security price} \quad (8)$$

In step 430, the computer may calculate the residual delta, according to Equation 9 below, as the difference between the index notional value to be allocated and the new index value (which may be calculated according to Equation 8 as described above in step 420). As illustrated in Table 2 below, for instance, the residual delta is −13,0812 (=34,950,000−34,950,013).

$$\text{residual delta} = \text{index notional value to be allocated} - \text{new index value} \quad (9)$$

The computer may then attribute the residual delta to the component securities at step 440 by attributing (e.g., adding or removing) a minimum tick of, for example, 0.0001 to a New component security price (e.g., as calculated in step 410), for example, starting from the lowest impact stock (e.g., the highest price) to the highest impact stock if this reduces the absolute value of the residual delta. In Table 3, the shares are first sorted in descending order based on their last traded price (from highest to lowest) so that share "A" is the first listed share and share "Y" the last listed share in the list of shares. As calculated in step 430, the residual delta is −13.0812, so that its absolute value is 13.0812. When subtracting the minimum tick size of 0.0001 to the New Component Security Price of share "A" (i.e. 169.2137 as calculated in Step 410), it reduces the absolute residual delta from −13.0812 to −12.6. Since it reduces the absolute residual delta, the price of share "A" is subtracted by 0.0001, so that its new price becomes 169.2316. Step 440 may iterate this for each share in the list from the first to the last. For share "Y", for example, adding or subtracting the minimum tick size of 0.0001 to the New Component Security Price of share "Y" does not reduce the absolute residual delta. Thus, the price of share "Y" is left unchanged at 11.63.

The illustrative results of the exemplary price calculation process 400 described above are shown in Tables 2 and 3 below. The calculations in Table 2 may provide a residual delta value after generating a new index value, whereas the calculations in Table 3 may provide a delta after attributing a minimum tick.

TABLE 2

| | Name | Last Traded Price (in EUROs) | Rounded Quantity of Compoment Secuity to Zero Decimals | New Component Security Price = LTP* (1 + FirstDelta %) Rounded to 4 Decimals (Step 410) | Price Variation |
|---|---|---|---|---|---|
| 1 | "A" | 169.25 | 4,840 | 169.2317 = Round (169.25 × 0.9892; 4) | −0.0108% |
| 2 | "B" | 137.95 | 3,978 | 137.9351 = Round (137.95 × 0.9892; 4) | −0.0108% |
| 3 | | 129.05 | 13,367 | 120.0360 | −0.0108% |
| ... | ... | ... | ... | ... | ... |
| 39 | "X" | 4.633 | 33,548 | 4.6325 | −0.0108% |
| 40 | "Y" | 0.819 | 116,332 | 0.8189 | −0.0122% |

Index Value to Allocate (Step 340): 34,950,000
Sum of QTY* New Price (New Index Value) (Step 420): 34,950,013
Residual Delta (Step 430): −13.0812

TABLE 3

| Name | Impact of 0.0001 Change on Index Value | Decision | Delta Change | New Price After 2nd Step (Step 440) | Price Variation |
|---|---|---|---|---|---|
| "A" | 0.48 | −0.0001 | −12.6 | 169.2316 | −0.01% |
| "B" | 0.4 | −0.0001 | −12.2 | 137.935 | −0.01% |
| "C" | 1.34 | −0.0001 | −10.86 | 129.0359 | −0.01% |
| ... | ... | | | | |
| "X" | 3.35 | 0 | −0.13 | 4.6325 | −0.01% |
| "Y" | 11.63 | 0 | −0.13 | 0.8189 | −0.01% |

Index Value to Allocate: 34,950,000 €
Sum of QTY* New Price: 34,950,000.13 €

Notably, an index-based EFP trading solution such as the systems and methods described above may include a fully automated straight-through processing solution. Central counterparty and clearing systems may be utilized to guarantee both futures and cash legs of EFPs. Continuous trading combined with the support of market makers and the implementation of market making schemes may allow EFP pricing to closely match market pricing. Liquidity may be concentrated in a central exchange and EFP trades may be pre-negotiated prior to submitting the trade data to the exchange. Regulatory compliance may be provided by automated post-trade obligations and reporting.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

In addition, the terms "comprising", "including", etc. signify "including, but not limited to" in the specification, claims and drawings.

The invention claimed is:

1. A non-transitory computer-readable medium storing program instructions that, when executed by one or more processors, causes the one or more processors to perform the functions of:
   receiving one or more orders from a buyer computer via one or more of a wired and a wireless network, the one or more orders comprising an amount of futures contracts for securities to be purchased in exchange for an amount of shares in the securities and a designated buy price;
   receiving one or more counter orders from a seller computer via one or more of the wired and the wireless network, the one or more counter orders comprising an amount of the futures contracts for the securities to be sold in exchange for an amount of the shares in the securities and a designated sale price;
   storing the one or more orders and the one or more counter orders in an order book;
   matching, based on one or more priority rules based on at least the designated buy price and the designated sale price, an order of the one or more orders with a counter order of the one or more counter orders stored in the order book to create a matched order having an exchange for physicals (EFP) price, the matched order comprising futures contracts for the securities to be exchanged and shares in the securities to be exchanged;
   automatically determining a value of a first leg of the matched order based on a price and a quantity of the futures contracts for the securities to be exchanged;
   automatically determining a value of a second leg of the matched order based on a price and a quantity of the shares in the securities to be exchanged by:
      continuously monitoring one or more live index values that fluctuate according to market movement, and
      continuously generating a new price for the shares in the securities to be exchanged that closely matches current market pricing by modifying a price of at least one underlying component of the securities based on, at least, the continuously monitored one or more live index values, wherein each of the at least one underlying component of the securities comprises a respective number of shares;
   continuously monitoring a difference between the value of the first leg and the value of the second leg; and
   once the difference is equivalent to the EFP price, simultaneously executing the first leg and the second leg.

2. The non-transitory computer-readable medium of claim 1, wherein the one or more orders and the one or more counter orders form transaction data, wherein the transaction data relates to an exchange-for-physical (EFP) transaction.

3. The non-transitory computer-readable medium of claim 1, wherein the one or more orders and the one or more counter orders form transaction data, the generating of the new price for the shares in the securities to be exchanged further comprises:

calculating a first delta percentage between the transaction data and an index based on an amount of securities to be exchanged, the price for the amount of securities to be exchanged, and a live index value among the one or more live index values;

applying the first delta percentage equally to each underlying component of the securities to be exchanged, thereby generating a new component security price for each of said at least one underlying component;

calculating a residual delta based on the first delta percentage and an index notional value; and adjusting one or more of the new component security prices by a minimum tick size based on the residual delta.

4. The non-transitory computer-readable medium of claim 3, wherein the generating of the new price for the shares in the securities to be exchanged further comprises:

calculating a component security weight based on the respective number of shares;

calculating a rounded quantity of component securities based on the amount of securities to be exchanged and the component security weight;

calculating a current index value based on the rounded quantity of component securities;

calculating an index notional to be allocated based on, at least, the EFP price;

calculating a first delta based on the current index value and the index notional; and calculating the first delta percentage based on the first delta and the current index value.

5. The non-transitory computer-readable medium of claim 4, wherein calculating the component security weight comprises solving the following equation:

$$\text{component security weight} = \text{free float} * \text{number of shares}.$$

6. The non-transitory computer-readable medium of claim 4, wherein calculating the rounded quantity of component securities comprises solving the following equation:

$$\text{rounded quantity of component security} = \frac{EFP\ \text{quantity} * \text{index component security weight} * \text{future lot size}}{\text{index divisor}}.$$

7. The non-transitory computer-readable medium of claim 4, wherein calculating the current index value comprises solving the following equation:

$$\text{current index value} = \sum_{i=1}^{40} (\text{rounded quantity of component security}_i * LTP\ \text{component security}).$$

8. The non-transitory computer-readable medium of claim 4, wherein calculating the index notional to be allocated comprises solving the following equation:

$$\text{index notional to be allocated} = [LTP\ \text{of index future} - EFP\ \text{price}] * EFP\ \text{quantity} * \text{future lot size}.$$

9. The non-transitory computer-readable medium of claim 4, wherein calculating the first delta comprises solving the following equation:

$$\text{first delta} = \text{index notional value to be allocated} - \text{current index value}.$$

10. The non-transitory computer-readable medium of claim 4, wherein calculating the first delta percentage comprises solving the following equation:

$$\text{first delta \%} = \frac{\text{first delta}}{\text{current index value}}.$$

11. The non-transitory computer-readable medium of claim 3, wherein the program instructions further cause the one or more processors to perform the functions of:

calculating a new component security price based on the first delta percentage;

calculating a new index value based on the new component security price and a rounded quantity of component securities; and calculating the residual delta based on an index notional to be allocated and the new index value.

12. The non-transitory computer-readable medium of claim 11, wherein calculating the new component security price comprises solving the following equation:

$$\text{new component security price} = LTP\ \text{component security} * (1 + \text{delta \%}) \text{ rounded to one or more decimal places}.$$

13. The non-transitory computer-readable medium of claim 11, wherein calculating the new index value comprises solving the following equation:

$$\text{new index value} = \sum_{i=1}^{40} \text{rounded quantity of component security}_i * \text{new component security price}.$$

14. The non-transitory computer-readable medium of claim 11, wherein calculating the residual delta comprises solving the following equation:

$$\text{residual delta} = \text{index notional value to be allocated} - \text{new index value}.$$

* * * * *